United States Patent
Lee et al.

(10) Patent No.: US 7,729,346 B2
(45) Date of Patent: Jun. 1, 2010

(54) UMTS CALL HANDLING METHODS AND APPARATUS

(75) Inventors: Weijun Lee, Plano, TX (US); Yong He, Plano, TX (US); Mansong Shen, Plano, TX (US)

(73) Assignee: GENBAND Inc., Plano, TX (US)

( * ) Notice: Subject to any disclaimer, the term of this patent is extended or adjusted under 35 U.S.C. 154(b) by 966 days.

(21) Appl. No.: 11/230,029

(22) Filed: Sep. 19, 2005

(65) Prior Publication Data

US 2006/0067221 A1    Mar. 30, 2006

Related U.S. Application Data (60) Provisional application No. 60/611,221, filed on Sep. 18, 2004.

(51) Int. Cl.
   *H04L 12/28* (2006.01)
(52) U.S. Cl. .................. 370/389; 370/394; 370/231
(58) Field of Classification Search .............. 370/216, 370/217, 218, 219, 220, 221, 225, 235, 335, 370/352, 392, 231, 230, 238, 242, 250, 254, 370/299, 329, 310, 337, 338, 342, 389, 394, 370/388, 396, 398, 399.2, 400, 466, 473, 370/474; 455/432, 439, 403, 434, 436, 435.1, 455/432.1, 411, 426.2, 509, 515, 517, 522; 711/190, 188; 709/226, 231, 235; 714/18, 714/748
See application file for complete search history.

(56) References Cited

U.S. PATENT DOCUMENTS

| | | | |
|---|---|---|---|
| 5,375,121 A | | 12/1994 | Nishino et al. |
| 5,710,976 A | * | 1/1998 | Hill et al. .................. 455/509 |
| 5,905,873 A | | 5/1999 | Hartmann et al. |
| 5,999,529 A | | 12/1999 | Bernstein et al. |

(Continued)

FOREIGN PATENT DOCUMENTS

CN    1504039    6/2004

(Continued)

OTHER PUBLICATIONS

Laurence, M., et al. "Voice Over ATM: A Hybrid TDM/ATM Design Approach," Electronic Engineering, Morgan-Grampian Ltd., vol. 71, No. 869, Jun. 1999, pp. 81-82, 84 and 86.

(Continued)

*Primary Examiner*—Aung S Moe
*Assistant Examiner*—Abdullah Riyami
(74) *Attorney, Agent, or Firm*—Jenkins, Wilson, Taylor & Hunt, P.A.

(57) ABSTRACT

Methods and apparatus for transparently switching a local instance of a UMTS protocol-based call from a first card or module of a media gateway to a second card or module of the media gateway, such that the remote end of the call is not aware that the call has been switched between the first and second cards or modules. Moreover, initially establishing call media flow may include implementing two timers of different duration during which call-initialization is retried if no Positive-Acknowledgement of call initialization is received, where a shorter-duration timer is relied upon to attempt retries if a Negative-Acknowledgement is received, and a longer-duration timer is relied upon to attempt retries if neither a Positive-Acknowledgement nor a Negative-Acknowledgement is received.

4 Claims, 5 Drawing Sheets

U.S. PATENT DOCUMENTS

| | | | |
|---|---|---|---|
| 6,026,086 A | 2/2000 | Lancelot et al. | |
| 6,046,999 A | 4/2000 | Miki et al. | |
| 6,147,988 A | 11/2000 | Bartholomew et al. | |
| 6,339,594 B1 | 1/2002 | Civanlar et al. | |
| 6,389,016 B1* | 5/2002 | Sabaa et al. | 370/389 |
| 6,392,993 B1* | 5/2002 | Hamilton et al. | 370/230 |
| 6,424,637 B1 | 7/2002 | Pecen et al. | |
| 6,549,945 B1* | 4/2003 | Sinibaldi et al. | 709/226 |
| 6,614,781 B1 | 9/2003 | Elliott et al. | |
| 6,625,169 B1 | 9/2003 | Tofano | |
| 6,647,428 B1 | 11/2003 | Bannai et al. | |
| 6,671,367 B1 | 12/2003 | Graf et al. | |
| 6,693,996 B2* | 2/2004 | Mansfield | 379/90.01 |
| 6,731,627 B1 | 5/2004 | Gupta et al. | |
| 6,765,931 B1 | 7/2004 | Rabenko et al. | |
| 6,795,437 B1* | 9/2004 | Rasanen et al. | 370/395.1 |
| 6,845,089 B1* | 1/2005 | Gu et al. | 370/337 |
| 6,850,778 B1 | 2/2005 | Honkala et al. | |
| 6,850,883 B1 | 2/2005 | Kapanen et al. | |
| 6,865,220 B2 | 3/2005 | Abrishami | |
| 6,898,208 B1 | 5/2005 | Sligo et al. | |
| 6,967,972 B1* | 11/2005 | Volftsun et al. | 370/466 |
| 6,973,024 B1* | 12/2005 | Joseph et al. | 370/217 |
| 7,006,489 B2 | 2/2006 | Li et al. | |
| 7,054,318 B2 | 5/2006 | Eneroth et al. | |
| 7,054,320 B1 | 5/2006 | Lee et al. | |
| 7,058,085 B2* | 6/2006 | Earnshaw et al. | 370/473 |
| 7,068,623 B1 | 6/2006 | Barany et al. | |
| 7,072,358 B2 | 7/2006 | Suvanen | |
| 7,103,021 B2 | 9/2006 | Jou | |
| 7,162,024 B2 | 1/2007 | Wah et al. | |
| 7,180,892 B1 | 2/2007 | Tackin | |
| 7,181,209 B2* | 2/2007 | Tamura | 455/432.1 |
| 7,203,226 B1 | 4/2007 | Rabipour et al. | |
| 7,245,589 B2* | 7/2007 | Neulist et al. | 370/254 |
| 7,245,931 B2* | 7/2007 | Wang et al. | 455/515 |
| 7,304,984 B2* | 12/2007 | Butler et al. | 370/352 |
| 7,305,229 B2 | 12/2007 | Fox et al. | |
| 7,349,698 B2 | 3/2008 | Gallagher et al. | |
| 7,369,859 B2 | 5/2008 | Gallagher | |
| 7,471,655 B2 | 12/2008 | Gallagher et al. | |
| 7,593,415 B2 | 9/2009 | Li et al. | |
| 2001/0036158 A1 | 11/2001 | Hallenstal et al. | |
| 2002/0001302 A1 | 1/2002 | Pickett | |
| 2002/0013147 A1* | 1/2002 | Fauconnier et al. | 455/422 |
| 2002/0106029 A1 | 8/2002 | Bunn et al. | |
| 2003/0032440 A1 | 2/2003 | Sato et al. | |
| 2003/0058822 A1 | 3/2003 | Jou | |
| 2003/0123485 A1 | 7/2003 | Yi et al. | |
| 2003/0134653 A1* | 7/2003 | Sarkkinen et al. | 455/517 |
| 2003/0135784 A1* | 7/2003 | Yamaguchi et al. | 714/18 |
| 2003/0210659 A1 | 11/2003 | Chu et al. | |
| 2004/0008652 A1 | 1/2004 | Tanzella et al. | |
| 2004/0037224 A1* | 2/2004 | Choi et al. | 370/235 |
| 2004/0047364 A1 | 3/2004 | Briggs et al. | |
| 2004/0090989 A1 | 5/2004 | Kobayashi | |
| 2004/0100914 A1 | 5/2004 | Hellwig et al. | |
| 2004/0114588 A1 | 6/2004 | Bhaskaran | |
| 2004/0114922 A1* | 6/2004 | Hardee | 398/17 |
| 2004/0131051 A1 | 7/2004 | Rabipour et al. | |
| 2004/0196867 A1 | 10/2004 | Ejzak et al. | |
| 2004/0208132 A1* | 10/2004 | Neulist et al. | 370/252 |
| 2004/0252681 A1 | 12/2004 | Rabipour et al. | |
| 2004/0254786 A1 | 12/2004 | Kirla et al. | |
| 2004/0266426 A1* | 12/2004 | Marsh et al. | 455/426.2 |
| 2005/0007973 A1* | 1/2005 | Jang et al. | 370/319 |
| 2005/0013281 A1 | 1/2005 | Milton et al. | |
| 2005/0027948 A1* | 2/2005 | Marlan et al. | 711/150 |
| 2005/0073977 A1* | 4/2005 | Vanghi et al. | 370/335 |
| 2005/0074017 A1 | 4/2005 | Qian et al. | |
| 2005/0099940 A1* | 5/2005 | Ohenoja et al. | 370/217 |
| 2005/0105512 A1 | 5/2005 | Myhre et al. | |
| 2005/0157823 A1 | 7/2005 | Sudhakar | |
| 2005/0185604 A1* | 8/2005 | Agarwal | 370/299 |
| 2005/0195829 A1 | 9/2005 | Ward | |
| 2005/0232232 A1 | 10/2005 | Farber et al. | |
| 2005/0267746 A1 | 12/2005 | Jelinek et al. | |
| 2006/0050664 A1 | 3/2006 | Guey | |
| 2006/0062225 A1 | 3/2006 | Li | |
| 2006/0092927 A1 | 5/2006 | Li et al. | |
| 2006/0154686 A1* | 7/2006 | Sarkkinen et al. | 455/522 |
| 2006/0193289 A1* | 8/2006 | Ronneke et al. | 370/329 |
| 2007/0041320 A1 | 2/2007 | Chen et al. | |
| 2007/0041360 A1 | 2/2007 | Gallagher et al. | |
| 2007/0043558 A1 | 2/2007 | Schwarz et al. | |
| 2007/0127357 A1 | 6/2007 | Tamura | |
| 2007/0127436 A1* | 6/2007 | Karimi-Cherkandi et al. | 370/352 |
| 2007/0135165 A1 | 6/2007 | Junghanns et al. | |
| 2007/0140214 A1 | 6/2007 | Zoltan | |
| 2007/0140293 A1 | 6/2007 | Agarwal et al. | |
| 2007/0165636 A1 | 7/2007 | He et al. | |
| 2007/0186002 A1* | 8/2007 | Campbell et al. | 709/231 |
| 2008/0225765 A1* | 9/2008 | Marinier et al. | 370/310 |
| 2008/0293416 A1* | 11/2008 | Yi et al. | 455/436 |
| 2008/0316980 A1* | 12/2008 | Ahlen et al. | 370/338 |

FOREIGN PATENT DOCUMENTS

| | | |
|---|---|---|
| CN | 101341730 A | 1/2009 |
| CN | 02808634.1 | 4/2009 |
| DE | 198 29 822 | 1/2000 |
| EP | 1 017 217 A2 | 7/2000 |
| EP | 1 364 499 B1 | 7/2009 |
| GB | 2363295 | 12/2001 |
| WO | WO 99/29136 | 6/1999 |
| WO | WO 99/40569 | 8/1999 |
| WO | WO 02/069588 A2 | 9/2002 |
| WO | WO 02/069588 A3 | 9/2002 |
| WO | WO 03/043299 A1 | 5/2003 |
| WO | WO 2005/050960 A1 | 6/2005 |
| WO | WO 2007/022461 A2 | 2/2007 |
| WO | WO 2007/084417 A2 | 7/2007 |

OTHER PUBLICATIONS

Singer, Jozef, et al. "Narrowband Services Over ATM Networks: Evaluation of Trunking Methods," World Telecommunications Congress, vol. 2, Sep. 21, 1997, pp. 17-25.

"Universal Mobile Telecommunications System (UMTS); UTRAN lu Interface User Plane Protocols (3GPP TS 25.415 version 5.3.0 Release 5)," ETSI, ETSI TS 125 415, pp. 1-65 (Dec. 2002).

Interview Summary for U.S. Appl. No. 11/207,572 (Oct. 16, 2009).

Interview Summary for U.S. Appl. No. 11/121,626 (Oct. 15, 2009).

Commonly-assigned, co-pending U.S. Appl. No. 12/535,655 for "Methods, Systems, and Computer Readable Media for Intelligent Optimization of Digital Signal Processor (DSP) Resource Utilization in a Media Gateway", (Unpublished, filed Aug. 4, 2009).

Final Official Action for U.S. Appl. No. 11/207,572 (May 28, 2009).

Non-Final Official Action for U.S. Appl. No. 11/121,626 (May 18, 2009).

Notice of Allowance and Fee(s) Due for U.S. Appl. No. 11/297,941 (May 15, 2009).

Final Official Action for U.S. Appl. No. 11/297,941 (Jan. 22, 2009).

Communication under Rule 71(3) EPC for European Patent Application No. 02 709 657.7 (Jan. 9, 2009).

Notice of Grant of Patent Right for Invention for Chinese Patent Application No. 02808634.1 (Dec. 26, 2008).

Final Official Action for U.S. Appl. No. 11/121,626 (Nov. 13, 2008).

Non-Final Official Action for U.S. Appl. No. 11/207,572 (Oct. 6, 2008).

Official Action for Chinese Patent Application No. 02808634.1 (Jun. 20, 2008).

Non-Final Official Action for U.S. Appl. No. 11/297,941 (May 1, 2008).

Communication pursuant to Rules 161 and 162 EPC for European application No. 06813571.4 (Mar. 28, 2008).

Non-Final Official Action for U.S. Appl. No. 11/121,626 (Feb. 20, 2008).

Notification of Transmittal of the International Search Report and the Written Opinion of the International Searching Authority, or the Declaration for International Application No. PCT/US07/00942 (Oct. 12, 2007).

Notification of Transmittal of the International Search Report and the Written Opinion of the International Searching Authority, or the Declaration for International Application No. PCT/US06/32484 (May 7, 2007).

International Search Report for International Application No. PCT/US2006/028549 (Dec. 11, 2006).

Communication pursuant to Article 96(2) EPC for European Application No. 02709657 (Jan. 23, 2006).

Notice of Allowance and Fee(s) Due for U.S. Appl. No. 09/792,265 (Sep. 16, 2005).

Final Official Action for U.S. Appl. No. 09/792,265 (Jun. 15, 2005).

"Third Generation Partnership Project; Technical Specification Group Core Network and Terminals; Interworking Between the IP Multimedia (IM) Core Network (CN) Subsystem and Circuit Switched (CS) Networks (Release 6)" 3GPP TS 29.163, pp. 1-128 (Jun. 2005).

Agilent Technologies, "UMTS Network and Service Assurance," International Engineering Consortium, http://www.iec.org/online/tutorials/agilent_umts_network/topic03.html, pp. 1-4 (Copyright 2005).

"Digital Cellular Telecommunications System Phase (2+); Universal Mobile Telecommunications System (UMTS); AMR Speech Codec, Wideband; Interface to Iu and Uu (3GPP TS 26.202 version 6.0.0 Release 6)," Global System for Mobile Communications ETSI TS 126 202, pp. 1-14 (Dec. 2004).

Non-Final Official Action for U.S. Appl. No. 09/792,265 (Oct. 4, 2004).

Notification of Transmittal of International Preliminary Examination Report for International Application No. PCT/US02/05410 (Dec. 5, 2003).

Written Opinion for International Application No. PCT/US02/05410 (Jun. 13, 2003).

Notification of Transmittal of the International Search Report or the Declaration for PCT/US02/05410 (Dec. 27, 2002).

Sjoberg et al., "Real-Time Transport Protcol (RTP) Payload Format and File Storage Format for the adaptive Multi-Rate (AMR) and Adaptive Multi-Rate Wideband (AMR-WB) Audio Codecs," Network Working Group, http://www.apps.ietf.org/rfc/rfc3267html, pp. 1-48 (Jun. 2002).

"Third Generation Partnership Project," Meeting Report v3.0.0, 3GPP TSG-TrFO Workshop#04, pp. 1-18 (Oct. 17-19, 2000).

Final Official Action for U.S. Appl. No. 11/351,339 (Mar. 1, 2010).

Notice of Allowance and Fee(s) Due for U.S. Appl. No. 11/207,572 (Jan. 26, 2010).

Final Official Action for U.S. Appl. No. 11/121,626 (Jan. 12, 2010).

Official Action for U.S. Appl. No. 11/351,339 (Apr. 1, 2009).

Notice of Allowance and Fee(s) Due for U.S. Appl. No. 11/351,339 (Sep. 26, 2008).

R.L. Bunting (Editor), "Transcoder Free Operation," $3^{rd}$ Generation Partnership, Version 1.0, Project 2 (Mar. 18, 2004).

* cited by examiner

UMTS CALL HANDLING METHODS AND APPARATUS

CROSS-REFERENCE TO RELATED APPLICATIONS

This application claims the priority of the earlier filing date of commonly assigned U.S. Provisional Application No. 60/611,221, entitled "MEDIA GATEWAY FOR MULTIPLE WIRELINE AND WIRELESS FORMATS, COMPONENTS THEREOF, AND PROCESSES PERFORMED THEREIN," filed on Sep. 18, 2004, the entirety of which is hereby incorporated by reference herein.

This application is also related to commonly assigned U.S. patent application Ser. No. 09/792,265, entitled "VOICE PACKET SWITCHING SYSTEM AND METHOD," filed on Feb. 23, 2001, the entirety of which is hereby incorporated by reference herein.

This application is also related to commonly assigned U.S. patent application Ser. No. 11/121,626, entitled "APPARATUS AND METHODS FOR PER-SESSION SWITCHING FOR MULTIPLE WIRELINE AND WIRELESS DATA TYPES," filed on May 4, 2005, the entirety of which is hereby incorporated by reference herein.

BACKGROUND

Switchover is an important feature of media gateways to support scheduled in-service upgrade and to handle unexpected card failures. When a working service module or card of a media gateway fails, the media gateway must include provisions to move or "switchover" active channels onto a backup module or card. Moreover, it is desirable that the switchover be transparent to the remote end of any active calls, but this can be hard to achieve in some cases, such as in IuUP-based calls used in UMTS networks.

That is, at least according to the standard IuUP protocol state machine, a UMTS IuUP call instance cannot be transparently switched from one service card over to another service card because, to transit from the Null state to the Transfer Data Ready state, an IuUP call instance must go through the Initialization state, and must send out a new IuUP INIT message to the remote peer and receive a positive acknowledgement.

There is also a need in this area of technology for significantly reducing call drop rates and increasing service provider revenue. For example, when a packet (IP or ATM) network has high packet loss, the IuUP/NbUP INIT messages to initiate a UMTS call are often lost, and cannot reach the far-end peer. One or more retries may be attempted but, eventually, after a configured timer expires without receiving any positive acknowledgement message, the local end stops sending the INIT messages, and the call is dropped. In another scenario, when the local end starts to send INIT messages but the far-end has not yet been set up, the INIT messages sent by the local end will be dropped by the far end. Again, one or more retries may be attempted but, eventually, after a configured timer expires without receiving any positive acknowledgement message, the local end stops sending the INIT messages, and the call is dropped.

The standard UMTS IuUP protocol fails to handle these scenarios properly because it does not differentiate between the "NEGATIVE Acknowledgement" case, which means a definitive negative response, and the "No Acknowledgement" case, which means lack of any positive or negative response and may need additional time for retries. A single timer is used for both cases, which is usually small in order to speed up the decision at the "NEGATIVE Acknowledgement" case, but not sufficiently long to accommodate the "No Acknowledge" case.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
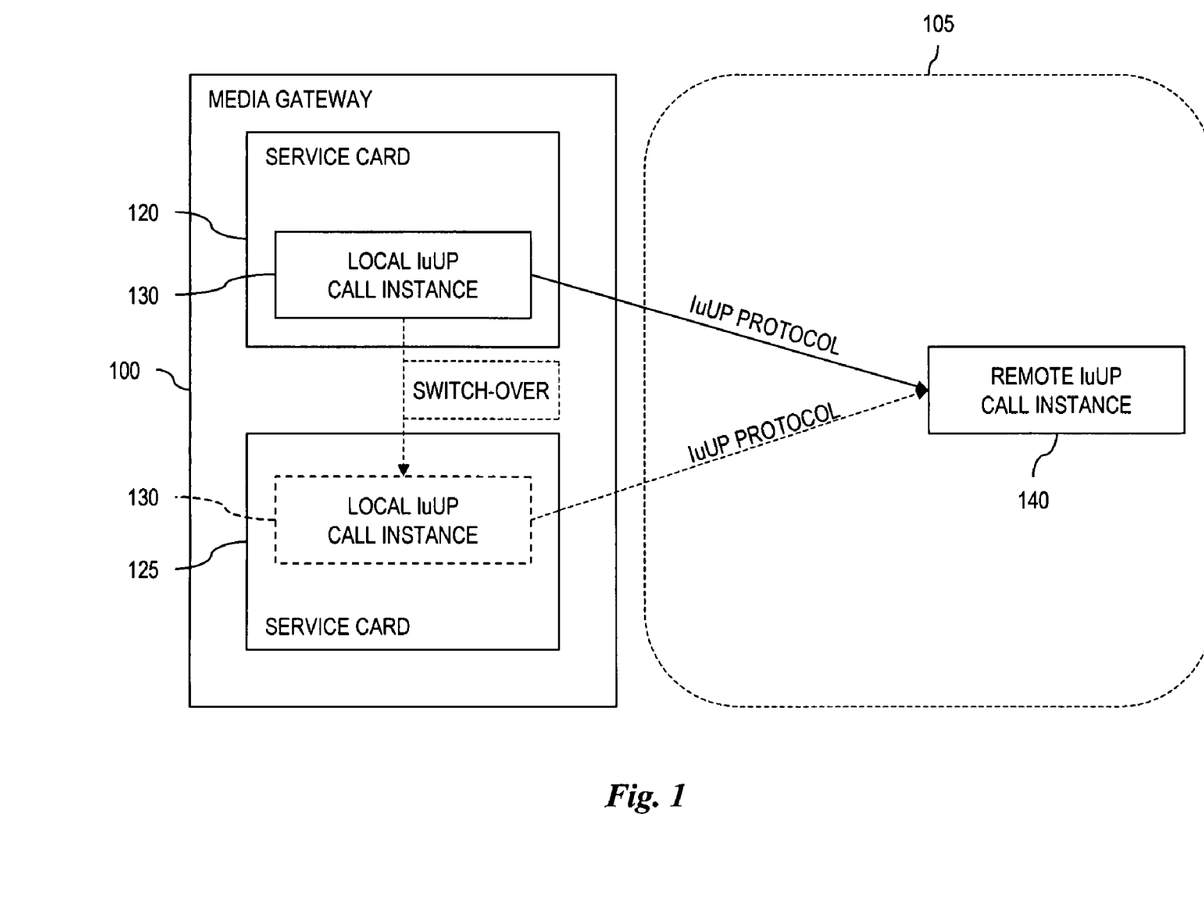
FIG. 1 is a schematic view of at least a portion of an embodiment of apparatus and/or network architecture according to aspects of the present disclosure.

Referring to FIG. 1, illustrated is a schematic view of at least a portion of one embodiment of a media gateway 100 (or similar switching apparatus) according to aspects of the present disclosure. The media gateway 100 includes at least two service cards 120, 125, each of which are configured to handle at least one local IuUP call instance 130. The local call instance 130 is initially handled by service card 120 and is then switched over to service card 125 (as indicated by the dashed lines). However, such switchover between service cards 120, 125 is transparent to the associated, remote IuUP call instance 140, which communicates with the local call instance 130 via IuUP protocol over an ATM, IP or other network 105.

Figure 2:
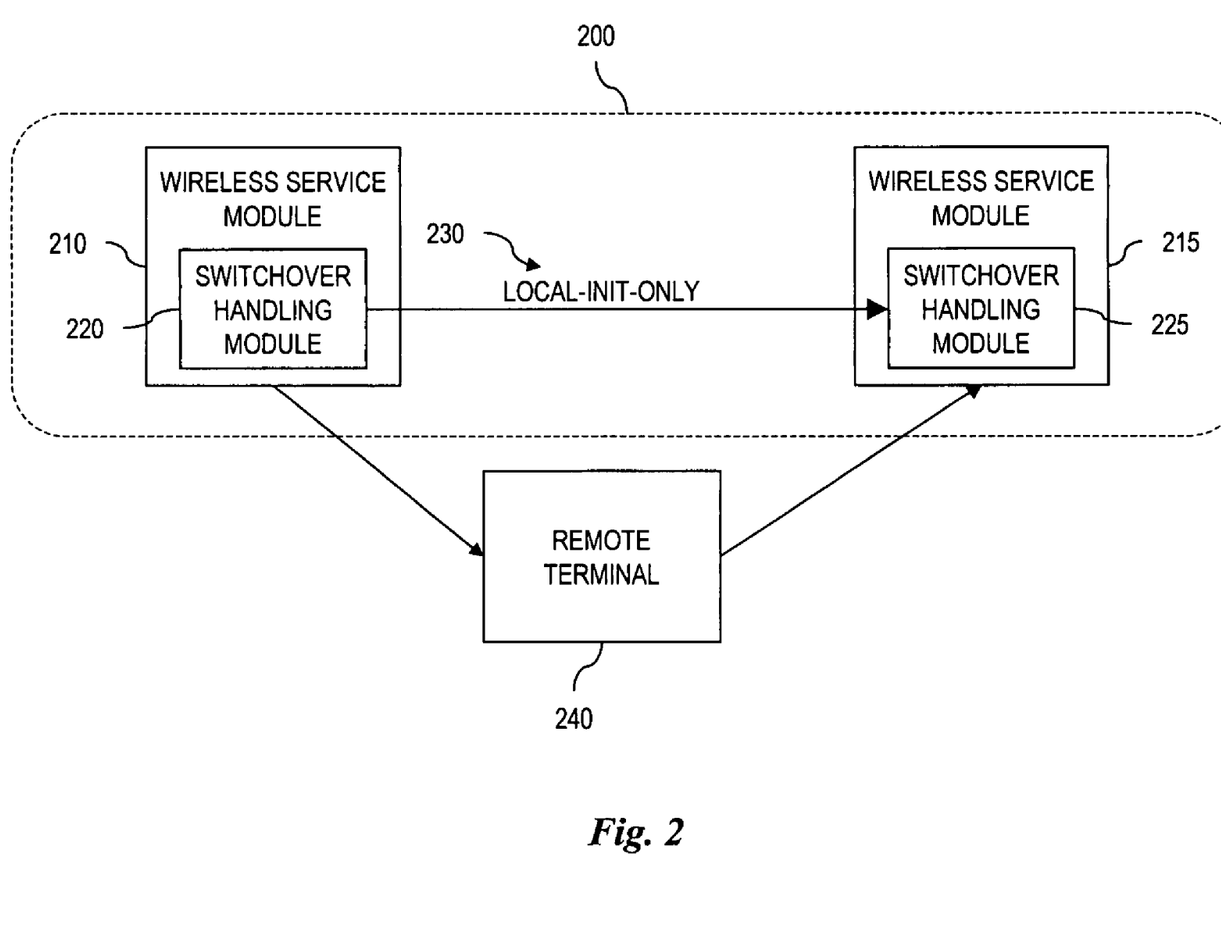
FIG. 2 is a schematic view of at least a portion of an embodiment of the apparatus and/or network architecture shown in FIG. 1.

Referring to FIG. 2, illustrated is a schematic view of at least a portion of one embodiment of the media gateway 100 shown in FIG. 1, herein designated by the reference numeral 200. The media gateway 200 includes wireless service modules 210, 215, each of which may be substantially similar to and/or include the service cards 120, 125 shown in FIG. 1. Each wireless service module 210, 215 includes a corresponding switchover handling module 220, 225, respectively, which are configured to cooperate to transparently switchover a call with a remote terminal 240 (e.g., a RAN)—that is, switchover the call in a manner that is transparent to the remote terminal 240.

An active one of the wireless service modules 210, 215 (e.g., module 210 in the embodiment and status illustrated in FIG. 2) is configured to receive switchover instruction from a control module, which may be located elsewhere within the media gateway 200. The switchover handling module 220 is configured to generate a Local-Init-Only message 230, possibly in addition to performing other tasks in response to the switchover instruction. The active wireless service module 210 and/or its switchover handling module 220 then sends the Local-Init-Only message 230 to a "peer" of the active wireless service module (e.g., module 215 in FIG. 2).

The peer switchover handling module 225 is configured to receive the Local-Only-Init message 230. The switchover handling module 225 (as well as module 220) is also configured to adjust its state machine, enter an active state, and suppress sending of the UMTS INIT message to the remote terminal 240, as may otherwise be required by the UMTS Iu-UP protocol, possibly in addition to performing other functions of taking over as the new active wireless service module. Normal protocol messaging required for the active state by the UMTS Iu-UP protocol may then be sent to the remote terminal 240.

According to aspects of the present disclosure, at least in some embodiments and implementations, the newly active wireless service module will not have to go through a negotiation process with the remote radio access network or terminal 240. In some instances, this can decrease the risk of dropping the call in progress.

Figure 3:
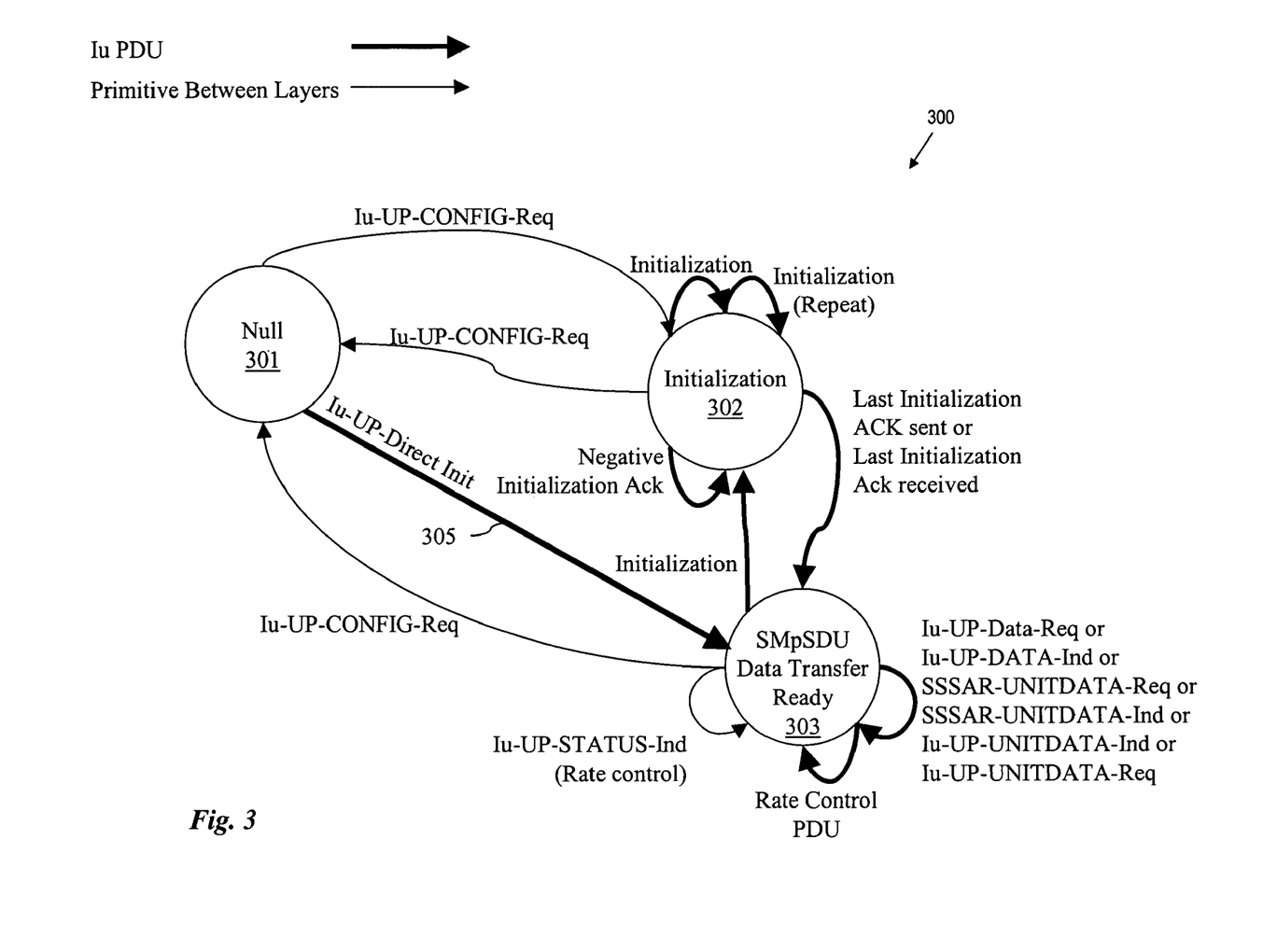
FIG. 3 is a schematic view of at least a portion of an embodiment of an IuUP protocol based state machine according to aspects of the present disclosure.

Aspects of the present disclosure are also demonstrated in FIG. 3, which is a schematic view of a modified portion of the standard IuUP protocol state machine (such as is represented by FIG. B.2 in the 3GPP specification of 3GPP TS 25.415). Only the portion used by IuUP Support Mode is shown in FIG. 3. However, at least the illustrated portion of the modified IuUP protocol state machine is herein designated by the reference numeral 300.

An IuUP Support Mode call instance can be in one of the following states: Null state 301, Initialization state 302, and SMpSDU Data Transfer Ready state 303. To transition from the Null state 301 to the Transfer Data Ready state 303 in the standard IuUP protocol state machine, an IuUP call instance must go through the Initialization state 302, and must send out a new IuUP INIT message to the remote peer and receive a positive acknowledgement. However, at least in one embodiment according to aspects of the present disclosure, such as shown in FIG. 3, a direct transition 305 between the Null state 301 and the Data Ready state 303 is added, thus allowing transition without sending out any IuUP INIT message to the remote peer and without waiting for any acknowledgement from the remote peer.

Aspects of this transparent IuUP switchover can minimize the service impact to the network when, for example, a media gateway needs to perform a scheduled in-service upgrade or handle an unexpected card failure, and needs to move IuUP calls from the active card to the backup card. Of course, other advantages are also within the scope of the present disclosure.

Figure 4:
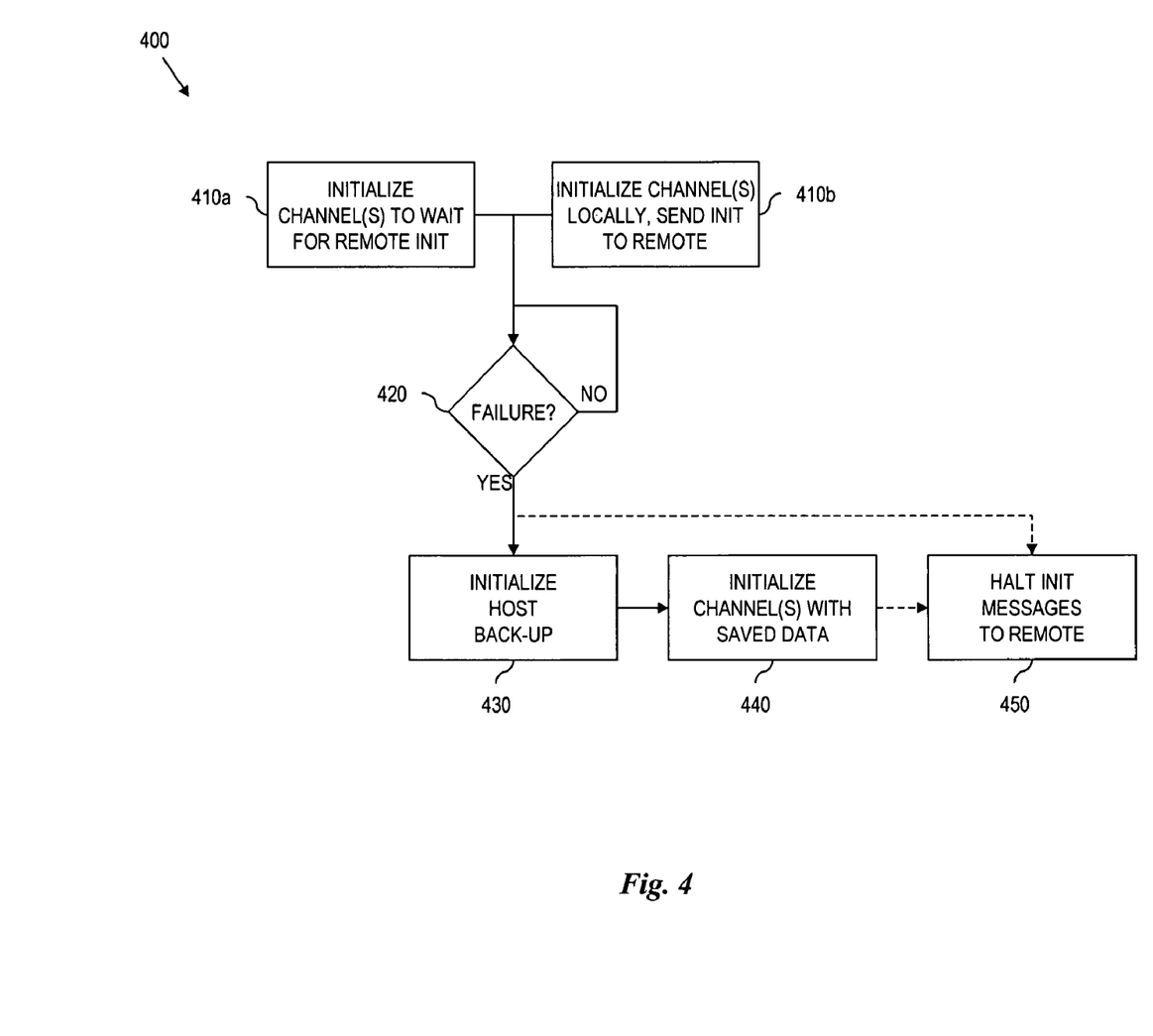
FIG. 4 is a flowchart diagram of at least a portion of an embodiment of a method according to aspects of the present disclosure.

Referring to FIG. 4, illustrated is a flow-chart diagram of at least a portion of one embodiment of a method 400 according to aspects of the present disclosure. The method 400 includes at least two possible initialization steps 410a, 410b. In step 410a, each channel is initialized to wait for a remote INIT message. In step 410b, local initialization is performed, and an INIT message is sent to the remote terminal. Either of steps 410a and 410b may be performed. In one embodiment, if step 410b is performed, one or more digital signal processor (DSP) and/or other processing means within or otherwise associated with the media gateway may still report received INIT messages to the host application.

A decisional step 420 determines when a module or card fails, at which time the host application may initialize the backup card in a step 430 and locally initialize one or more channels with the saved data 440. For example, the IuUP data structures of each active channel, including the RFCI table, the current TX frame number, etc., may be locally copied onto the backup module or card, such that IuUP operation may continue without notifying the remote terminal or end (e.g., the RNC). The method 400 may also include a step 450 in which the host application is also configured to not send an INIT message to the remote terminal. Two or more of the steps 430, 440 and 450 may be performed substantially simultaneously, or in sequences other than as shown in FIG. 4, as indicated by the dashed lines in FIG. 4.

In some embodiments, some incoming IuUP frames may be lost during the transition period. Also, some transmitted IuUP frames may continue from the previous frame number, although in other embodiments the transmitted IuUP frames may restart from frame number 0. The remote RNC side may also not receive frames during at least a portion of the transition period, and may resume receiving frames with some discontinuity in frame numbers. However, such as for conversational and streaming traffic classes, the frame numbers may not be transaction-based (e.g., may be time-based), such that discontinuous frame numbers may not be treated as frame loss or unexpected frame numbers. For example, discontinuous frame numbers may instead be treated as time alignment matters instead of as errors, such as when frame numbers are treated as time stamps, whereby this timing information may be employed by a channel frame loss algorithm instead of generating error events. In one embodiment, the remote RNC may not attempt to detect any discontinuities in the frame numbering, such as when it is time-based. Consequently, the RNC may pass this discontinuity directly to the handset, where it may be handled by a codec function (e.g., a vocoder). A larger time delta between consecutive packets may also be passed in some embodiments, which may result in the replay of a previous packet or insertion of silence.

One or more embodiments of the method 400 may be implemented or performed by one or more of the apparatus described above, including implementations within the media gateway 100 shown in FIG. 1, the media gateway 200 shown in FIG. 2, the state machine 300 shown in FIG. 3, or combinations of aspects thereof. In these and other implementations within the scope of the present disclosure, aspects of the method 400 and similar embodiments may allow the newly initialized channel(s) to resume operation without ever providing any indication of such to the remote terminal.

Figure 5:
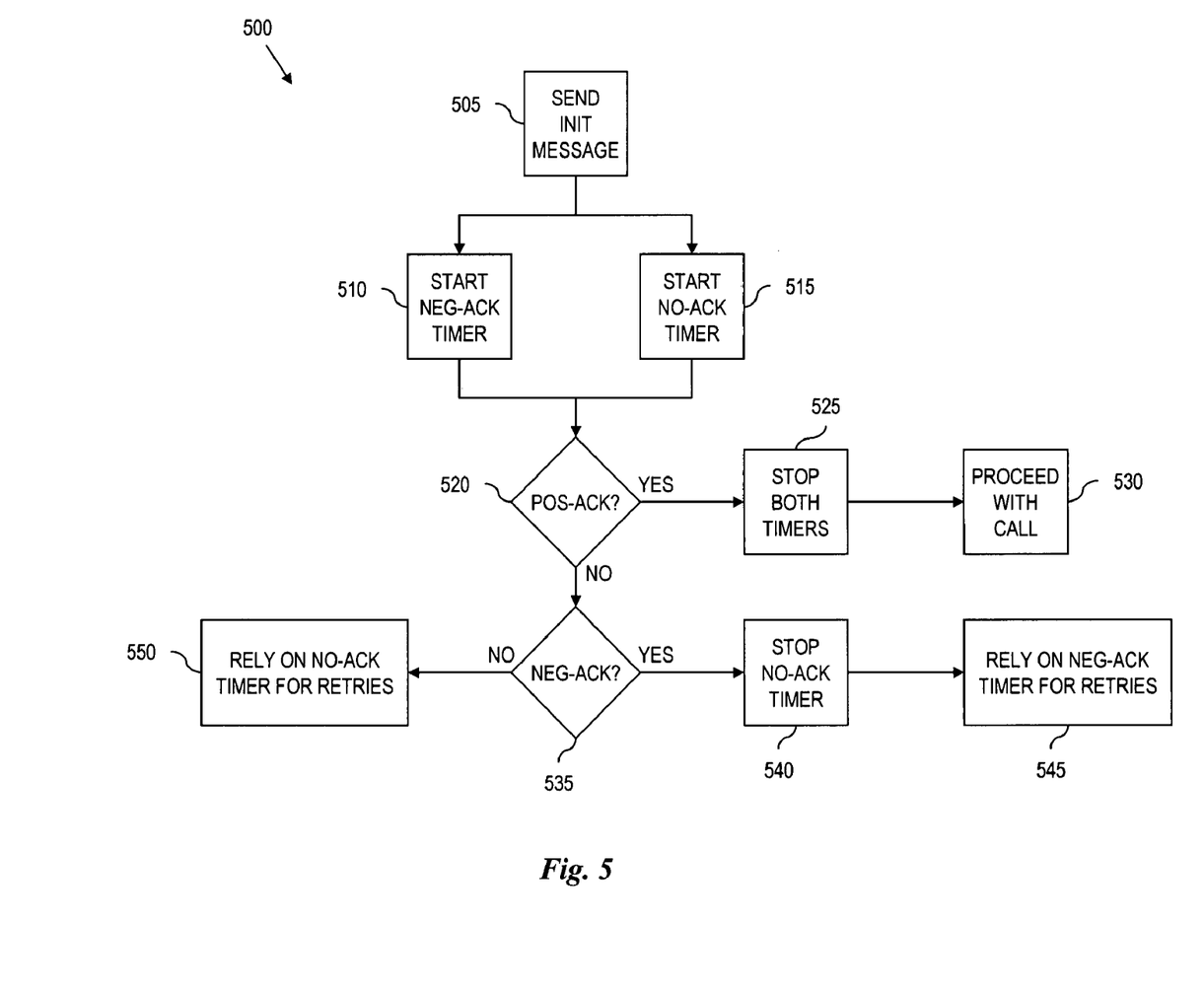
FIG. 5 is a flowchart diagram of at least a portion of an embodiment of a method according to aspects of the present disclosure.

Referring to FIG. 5, illustrated is a flow-chart diagram of at least a portion of another embodiment of a method 500 according to aspects of the present disclosure. Embodiments of the method 500 include implementations for reducing the number of calls dropped when establishing the media flow of a UMTS call, including when the transport network has high packet loss rate and/or when there is race condition between the two ends.

The method 500 includes a step 505 in which an INIT message is sent from the local call end. This initiates a Negative-Acknowledgement timer in a step 510, and substantially simultaneously initiates a No-Acknowledgement timer in a step 515. Relative to conventional configurations, the Negative-Acknowledgement timer started in step 510 may be an existing timer, and the No-Acknowledgement timer started in step 515 may be an additional timer, although the reverse may also be true, or each timer may be new or additional relative to conventional configurations. The No-Acknowledgement timer may be significantly longer in duration relative to the Negative-Acknowledgement timer, such as to the extent necessary to allow sufficient time for retries when no response is received.

If any Positive-Acknowledgement message is received, as may be determined in a decisional step 520, then both timers may be stopped in a step 525, and the call may proceed in a step 530. However, if no Positive-Acknowledgement message is received, as may be determined in a decisional step 520, the method 500 continues by repeating one or more call-initialization processes, such as the re-transmission of the initialization message sent in step 505, or possibly by merely continuing to await the Positive-Acknowledgement message or another message.

For example, if any Negative-Acknowledgement message is received, as may be determined in the decisional step 535, then the No-Acknowledgement timer may be stopped in a step 540, such that only the Negative-Acknowledgement timer may be relied upon for determining how much longer call-initialization processing should be repeated, as represented by the step 545. Thus, the number of retries of call-initialization (e.g., the re-transmission of the initialization message to the remote end) may be dependent upon only the Negative-Acknowledgement timer, which is shorter in duration relative to the No-Acknowledgement timer, such that the number of retries may be fewer than if also relying upon the No-Acknowledgement timer.

However, if neither a Positive-Acknowledgement message nor a Negative-Acknowledgement message is received, as may be collectively determined by decisional steps 520 and 535, then the No-Acknowledgement timer can be relied upon for determining how much longer call-initialization processing should be repeated, as represented by the step 550. Consequently, because the No-Acknowledgement timer is longer in duration relative to the Negative-Acknowledgement timer, the likelihood of successful call set-up may be increased.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of establishing media flow for a universal mobile telecommunications service (UMTS) call between a local call instance and a remote call instance, the method comprising:
   transmitting an initialization message from the local call instance to the remote call instance;
   at the local call instance, starting, substantially simultaneously, a negative-acknowledgement timer and a no-acknowledgement timer, wherein the negative-acknowledgement timer is configured to expire after a first predetermined duration, the no-acknowledgement timer is configured to expire after a second predetermined duration, and the second predetermined duration is substantially longer than the first predetermined duration; and
   re-transmitting the initialization message from the local call instance to the remote call instance until the earliest of:
      receipt of positive-acknowledgement the remote call instance;
      expiration of the negative-acknowledgement timer at the local call instance if negative-acknowledgement is received from the remote call instance; and
      expiration of the no-acknowledgement timer at the local call instance if neither the positive-acknowledgement nor the negative-acknowledgement is received from the remote call instance, wherein the local call instance resides on a local media gateway and the remote call instance resides on a remote radio network controller (RNC); the method further comprising: stopping the negative-acknowledgement and no-acknowledgement timers when the positive-acknowledgement is received from the remote call instance; and stopping the no-acknowledgement timer when the negative-acknowledgement is received from the remote call instance.

2. The method of claim 1 wherein re-transmitting the initialization message includes re-transmitting the initialization message at periodic time intervals.

3. A media gateway apparatus configured to support media flow of a universal mobile telecommunications service (UMTS) call between a local call instance and a remote call instance, comprising:
   a negative-acknowledgement timer implemented at the local call instance and being active for a first predetermined duration commencing substantially simultaneously with initial transmission of an initialization message from the local call instance to the remote call instance;
   a no-acknowledgement timer implemented at the local call instance and being active for a second predetermined duration commencing substantially simultaneously with the initial transmission of the initialization message, wherein the second predetermined duration is substantially greater than the first predetermined duration; and
   means for re-transmitting the initialization message from the local call instance to the remote call instance until the earliest of:
      receipt of positive-acknowledgement from the remote call instance;
      expiration of the negative-acknowledgement timer at the local call instance if negative-acknowledgement is received from the remote call instance; and
      expiration of the no-acknowledgement timer at the local call instance if neither the positive-acknowledgement nor the negative-acknowledgement is received from the remote call instance, wherein the local call instance resides on the media gateway apparatus and the remote call instance resides on a remote radio network controller (RNC); wherein the negative-acknowledgement and no-acknowledgement timers are configured to be stopped upon receipt of the positive acknowledgement from the remote call instance prior to termination of either the first or second predetermined durations, and wherein the no-acknowledgement timer is configured to be stopped upon receipt of the negative-acknowledgement from the remote call instance prior to termination of the first predetermined duration.

4. The media gateway apparatus of claim 3 wherein the initialization message retransmitting means is configured to stop re-transmitting the initialization message if neither the positive-acknowledgement, the negative-acknowledgement, nor no-acknowledgement is received upon expiration of the negative-acknowledgement and no-acknowledgement timers.

* * * * *